United States Patent [19]

Schwartz

[11] 3,973,290

[45] Aug. 10, 1976

[54] METHOD SERVING THE STUNNING OF ANIMALS FOR SLAUGHTER

[75] Inventor: Werner Schwartz, Halstenbek, Germany

[73] Assignee: Werner Wacker, Silcherweg, Germany

[22] Filed: Dec. 13, 1974

[21] Appl. No.: 532,651

[52] U.S. Cl. .................................. 17/45; 17/1 E; 219/10.55 M
[51] Int. Cl.² .................................. A22B 3/00
[58] Field of Search .............. 17/1 R, 1 A, 1 E, 45; 219/10.55 M

[56] References Cited
UNITED STATES PATENTS
3,258,811  7/1966  Braun ........................ 17/1 E FOREIGN PATENTS OR APPLICATIONS
206,339  4/1968  U.S.S.R. .......................... 17/1 E

*Primary Examiner*—Louis G. Mancene
*Assistant Examiner*—Robert F. Cutting

[57] ABSTRACT

A method of stunning an animal prior to slaughter involves heating at least a portion of the brain of an animal, using electromagnetic wave energy which penetrates the skull of the animal. The temperature of substantial portions of the brain is raised to a minimum of 41° C in some cases and to higher temperatures in others. Heating of the brain is effected for a period of less than ten seconds and, preferably, for a period in the range of from 1 second to 7 seconds. The frequency of the electromagnetic wave energy is from 100 to 10,000 megacycles.

10 Claims, No Drawings

METHOD SERVING THE STUNNING OF ANIMALS FOR SLAUGHTER

The invention refers to a method serving the stunning of animals for slaughter.

Nowadays the stunning of animals for slaughter in big slaughterhouses in most cases is done by electric current; in this process electrodes are fixed to the head of the animal, and a more or less strong current is made to circulate between said electrodes. On fixing of the electrodes the animal is startled and tightens. The voltage shock in connection with the commencing tightening causes blood spots in the animal's meat which reduce the meat's quality. Whether the desired stunning effect in all cases actually is brought about is questionable, because it is not known which portion of the current actually is circulating through the brain. It is a fact that a very large portion of the current circulates over the moist skin of the animal. On the one hand, with many animals one observes an immediate stoppage of the heart, which, however, probably is due to the shock effect; on the other, one frequently observes no stunning effect at all.

It is the object of the invention to create a method of stunning which functions reliably in that it largely saves the animals from withstanding the agonies to which they have been exposed so far and avoids the reduction in meat quality observed in connection with the stunning by electroshock.

The solution according to the invention exists in that the animal's brain or a part thereof is heated through the irradiation of electromagnetic waves. Such heating has the same results as high fever, namely, unconsciousness, during which, however, the action of the heart is maintained or even intensified so that then the best possible bleeding of the animals for slaughter is achieved. The degree of temperature required depends on the species of animal; it is also of influence, whether the entire brain or only a part thereof and which part is heated. The final termperature shall be at least over 41° Celsius, preferably between 42° and 50° C.

The heating time preferably shall be shorter than 10 seconds, and shall be approximately between 7 seconds and 1 second. The shorter the heating time the quicker the stunning effect is attained, and the lesser are the pains inflicted upon the individual animal.

Very quick heating without contact can be achieved in particular with microwaves in a frequency range between 100 and 10,000 megacycles per second, preferably ranging between 500 and 2,000 megacycles per second. A non-contact stunning of the animals can be attained by such means.

As the devices producing the microwave beam can be directed at will, it is possible, with a correspondingly quick heating time, to stun the animals without holding them.

Penetration of microwaves into the brain is the better the thinner the radiated portion of the skull is. For practical purposes, the skull is radiated from the side in the temporal area; this applies in particular to pigs.

In this way a lightning-like rise of temperature in the brain can be achieved, at first bringing about a fading of consciousness and subsequently resulting in a positive stunning.

Thus, for example, a temperature rise of 10° was achieved in the skull of a pig by lateral radiation in the temporal area with a microwave beam of 955 megacycles per cycle second and 5 kw generation power applied over a time of 5 seconds; with a starting temperature of 40°C this means a final temperature of 50°C which guarantees a positive stunning of the animal.

I claim:

1. Method of stunning an animal in preparation for slaughter, comprising introducing electromagnetic wave energy by irradiation to heat at least a portion of the brain of the animal, the electromagnetic wave energy penetrating the skull of the animal.

2. A method as set forth in claim 1, wherein said heating step is effected by penetrating the skull laterally in the temporal area with the electromagnetic wave energy.

3. A method as set forth in claim 1, wherein the heating step heats substantial portions of the brain to a minimum temperature of 41°C.

4. A method as set forth in claim 1, wherein the heating step heats substantial portions of the brain to a minium temperature of 42°C.

5. A method as set forth in claim 1, wherein the heating step heats substantial portions of the brain to a minimum temperature of 45°C.

6. A method as set forth in claim 1, wherein the heating step heats substantial portions of the brain to a minimum temperature of 50°C.

7. A method as set forth in claim 1, wherein the heating step heats the brain for a period of time shorter than 10 seconds.

8. A method as set forth in claim 1, wherein the heating step heats the brain for a period of time in the range of from 1 second to 7 seconds.

9. A method as set forth in claim 1, wherein the heating step comprises penetrating the skull with electromagnetic wave energy having a frequency in the range of from 100 megacycles to 10,000 megacycles.

10. A method as set forth in claim 1, wherein the heating step comprises penetrating the skull with electromagnetic wave energy having a frequency in the range of from 500 megacycles to 2,000 megacycles.

* * * * *